United States Patent [19]

Shonai et al.

[11] Patent Number: 4,752,873
[45] Date of Patent: Jun. 21, 1988

[54] DATA PROCESSOR HAVING A PLURALITY OF OPERATING UNITS, LOGICAL REGISTERS, AND PHYSICAL REGISTERS FOR PARALLEL INSTRUCTIONS EXECUTION

[75] Inventors: Tohru Shonai; Eiki Kamada, both of Kokubunji; Shigeo Takeuchi, Hanno, all of Japan

[73] Assignees: Hitachi VLSI Eng. Corp.; Hitachi, Ltd., both of Tokyo, Japan

[21] Appl. No.: 865,466

[22] Filed: May 21, 1986

[30] Foreign Application Priority Data

May 22, 1985 [JP] Japan .................................. 60-108218

[51] Int. Cl.$^4$ ........................ G06F 15/31; G06F 12/00
[52] U.S. Cl. ..................................... 364/200; 364/736
[58] Field of Search ... 364/200 MS File, 900 MS File, 364/736

[56] References Cited

U.S. PATENT DOCUMENTS

| | | | |
|---|---|---|---|
| 3,840,861 | 10/1974 | Amdahl et al. | 364/200 |
| 4,085,450 | 4/1978 | Tulpuze | 364/200 |
| 4,136,383 | 1/1979 | Takesue | 364/200 |
| 4,435,765 | 3/1984 | Uchida et al. | 364/200 |
| 4,594,655 | 6/1986 | Hao et al. | 364/200 |
| 4,701,848 | 10/1987 | Clyde | 364/300 |

OTHER PUBLICATIONS

"An Efficient Algorithm for Exploiting Multiple Arithmetic Units" by R. M. Tomasulo, IBM Journal, Jan. 1967.

Primary Examiner—Raulfe B. Zache
Assistant Examiner—Thomas C. Lee
Attorney, Agent, or Firm—Antonelli, Terry & Wands

[57] ABSTRACT

In accordance with the invention, there are disposed a logical register group and a physical register group. Direct access is made to the logical register group on the basis of a register number designated by an instruction. To make access to the physical register group, there is disposed a circuit which converts the register number designated by the instruction to a physical register number.

A plurality of arithmetical or logical operation units (ALUs) are disposed to execute a plurality of instructions in parallel. There is further disposed a circuit which supplies an operand data from the physical register group to each ALU and writes the operation result data of each ALU into the physical register group and into the logical register group.

When a write register number designated by a preceding instruction A and a succeeding instruction B has the same value a, mutually different physical register numbers b' and b" are determined with respect to the write register number a for both instructions A and B. Therefore, the instruction B can be executed in parallel with the instruction A before the operation of the instruction A is complete.

2 Claims, 10 Drawing Sheets

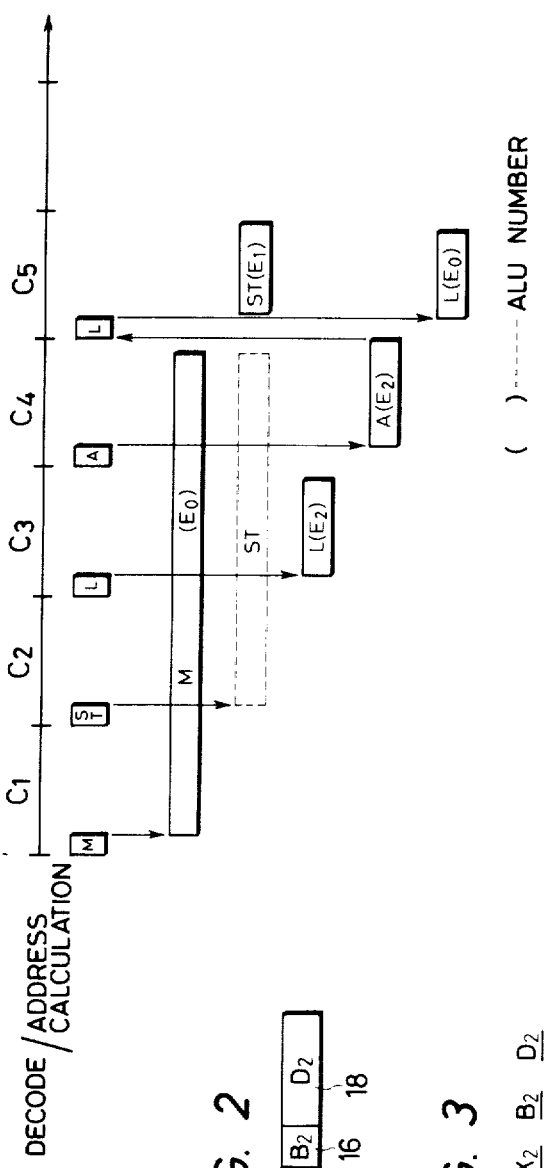
FIG. 4
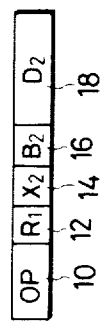
FIG. 2
FIG. 3
| | OP | $R_1$ | $X_2$ | $B_2$ | $D_2$ |
|---|---|---|---|---|---|
| ① | M | 2, | 7, | 8, | 100 |
| ② | ST | 2, | 7, | 8, | 200 |
| ③ | L | 2, | 7, | 8, | 300 |
| ④ | A | 2, | 7, | 8, | 400 |
| ⑤ | L | 4, | 2, | 8, | 150 |

FIG. 12A

| CYCLE | | $C_0$ | $C_1$ | $C_2$ | $C_3$ | $C_4$ | $C_5$ |
|---|---|---|---|---|---|---|---|
| | I-REG | — | M | ST | L | A | L |
| | DS | X | O | O | O | O | O |
| DECODER OUTPUTS | L | | X | X | O | X | O |
| | W | | O | X | O | O | O |
| | IW | | 2 | — | 2 | 2 | 4 |
| | IR | | 2 | 2 | — | 2 | 4 |
| | R | | O | O | X | O | O |
| | $X_2$ | | 7 | 7 | 7 | 7 | 2 |
| | $B_2$ | | 8 | 8 | 8 | 8 | 8 |
| | $D_2$ | | 100 | 200 | 300 | 400 | 150 |
| PHYSICAL REG CONTROL | JW | | 2 | — | 16 | 16 | |
| | JR | | 2 | 2 | — | 16 | |
| | OC | | X | O | X | X | |
| PARALLEL OPERATION CONTROL | $B_0$ | | | O | ← | ← | ← |
| | $W_0$ | | | O | O | O | O |
| | $JW_0$ | | | 2 | 2 | 2 | 2 |
| | $IW_0$ | | | 2 | 2 | 2 | 2 |
| | $R_0$ | | | O | X | X | X |
| | $JR_0$ | | | 2 | — | — | — |
| | $LAW_0$ | | | — | — | — | — |
| | $SET_0$ | M— | | O | X | X | X |
| | $BOP_0$ | | | O | X | X | X |
| | $EOP_0$ | | | X | X | X | O |
| | $B_1$ | | | | O | ← | ← |
| | $W_1$ | | | | X | X | X |
| | $JW_1$ | | | | — | — | — |
| | $IW_1$ | | | | — | — | — |
| | $R_1$ | | | | O | O | O |
| | $JR_1$ | | | | 2 | 2 | 2 |
| | $LAW_1$ | | | | O | O | O |
| | $SET_1$ | | | ST— | X | X | X |
| | $BOP_1$ | | | | X | X | O |
| | $EOP_1$ | | | | X | X | O |
| | $B_2$ | | | | | O | O |
| | $W_2$ | | | | | O | O |
| | $JW_2$ | | | | | 16 | 16 |
| | $IW_2$ | | | | L— | 2 | 2 |
| | $R_2$ | | | | | X | X |
| | $JR_2$ | | | | | — | O |
| | $LAW_2$ | | | | | — | 16 |
| | $SET_2$ | | | | | O | X |
| | $BOP_2$ | | | | | O | X |
| | $EOP_2$ | | | | | O | O |
| | LA | | | 0 | 1 | 2 | 2 |

| | CYCLE | $C_0$ | $C_1$ | $C_2$ | $C_3$ | $C_4$ | $C_5$ |
|---|---|---|---|---|---|---|---|
| PHYSICAL REG STATUS BITS | $W_{(2)}$ | M | 0 | ← | ← | ← | |
| | $LAW_{(2)}$ | | 0 | ← | ← | ← | |
| | $B_{(2)}$ | O | O | O | O | O | O |
| | $A_{(2)}$ | | | | O | O | O |
| | $W_{(16)}$ | | | | 0 | 0 | ← |
| | $LAW_{(16)}$ | | | L | 2 | 2 | ← |
| | $B_{(16)}$ | | | | O | O | O |
| | $A_{(16)}$ | | | | | AD | |
| SELECTOR 506 | LAW | — | — | 0 | — | 2 | — |
| CONVERSION TABLE 502 | $JWF_0$ | 0 | ← | ← | ← | ← | ← |
| | 1 | 1 | ← | ← | ← | ← | ← |
| | 2 | 2 | ← | ← | ← | 16 | ← |
| | 3 | 3 | ← | ← | ← | ← | ← |
| | 4 | 4 | ← | ← | ← | ← | ← |
| | 7 | 7 | ← | ← | ← | ← | ← |
| | 8 | 8 | ← | ← | ← | ← | ← |
| | 15 | 15 | ← | ← | ← | ← | ← |
| LOGICAL REG CONTROL 402 | $LAWL_{(2)}$ | | 0 | ← | 2 | 2 | |
| | $LAWL_{(4)}$ | | | | | | |
| | $WL_2$ | | | | | | |
| | $WL_4$ | | | | | | |

DATA PROCESSOR HAVING A PLURALITY OF OPERATING UNITS, LOGICAL REGISTERS, AND PHYSICAL REGISTERS FOR PARALLEL INSTRUCTIONS EXECUTION

BACKGROUND OF THE INVENTION

This invention relates to a data processor for improving processing speed by processing a plurality of instructions in parallel.

An example of a general purpose computer which improves processing speed by parallel processing of a plurality of instructions is the IBM360/91. This computer is described in detail in IBM Journal, Jan. 1967, "An Efficient Algorithm for Exploiting Multiple Arithmetic Units". This computer employs a common data bus system (hereinafter referred to as the "CDB system") in order to eliminate a parallel processing inhibition factor resulting from the repeated use of the same register between adjacent instructions. In this system, an instruction waiting for the operation result of a preceding instruction as an input operand is reserved at a reservation station (hereinafter referred to as "RS": corresponding to an instruction queue). As soon as the operation result is obtained, it is taken into an input operand register disposed in RS through the common data bus CDB, and the operation is started from the instruction for which all the input operands are determined.

In accordance with this CDB system, two registers for first and second operands must be disposed in RS for all the instructions that are being processed in the system as the input operand registers. If the maximum number of instructions being processed in the system is N, 2N registers must be disposed; hence, the logic scale increases. Furthermore, when the operation results are simultaneously obtained by arithmetical or logical operational units (hereinafter referred to as "ALU"), the CDB becomes a neck when transferring the operation results to ALUs that need them.

U.S. patent application Ser. No. 682,839 assigned to the applicant of the present application solves this problem. In this prior patent application, a greater number of registers are disposed than the total number of registers that can be designated by instructions, and when an instruction B which is designated to be stored in the same register b as the register designated to store the operation result by a preceding instruction is executed, the operation result of an instruction A is stored in the register b and the operation result of the instruction B, in another register b'. When the operation result of the instruction B is to be read out by a succeeding instruction, the instruction is read out from the register b' so that the succeeding instruction B can be executed without waiting for the execution of the preceding instruction A. According to this prior patent application, the number of necessary registers for making the maximum number of instructions to be simultaneously processed in the system may be about N.

Furthermore, when the operation results are simultaneously obtained by a plurality of ALUs, the prior art application writes them into separate registers and each ALU can independently read out data of a plurality of registers. Therefore, the operation results can be transferred simultaneously to a plurality of ALUs that need them.

In this prior art application, however, an instruction which is after the instruction B and is designated so as to read out the result from the register b must detect that the result that should have been stored in the register b by the instruction B is not stored in the register b but actually in the register b' and must read out the result from the register b'. In other words, an amount of time for examining the correspondence of b to b' (or "conversion time") is necessary, and an instruction processing time increases as much.

Generally, an instruction reads a register as part of a decoding operation, calculates an address and reads out an operand data from a memory; hence, an amount of time for examining that the register b corresponds to b' ("conversion") is necessary. Therefore, the decoding time increases due to this conversion time and eventually, a machine cycle time of a data processing unit as a whole increases.

SUMMARY OF THE INVENTION

It is an object of the present invention to provide a data processor capable of parallel processing of a plurality of instructions at a higher speed and capable of reducing the decoding time described above.

To accomplish the object described above, the present invention disposes a first kind of register group (hereinafter referred to as "logical registers") consisting of a number of registers equal to the maximum number of registers that can be designated by instructions, and a second kind of register group (hereinafter referred to as "physical register group") consisting of a number of registers greater than the maximum register number. Direct access is made to the logical register group on the basis of a register number designated by the instruction. In order to make access to the physical register group, there is disposed a circuit which converts the register number designated by the instruction to a physical register number.

A plurality of ALUs are disposed in order to execute a plurality of instructions in parallel. There is further disposed a circuit which supplies operand data from the physical register group to each ALU and writes the operation result data of each ALU into the physical register group and into the logical register group. When an instruction for storing the operation result or an instruction for reading out the operand data from the register and to make calculation for it is to be executed, there is disposed a circuit which changes the write or read register number designated by the instruction to the write or read physical register number corresponding thereto, and writes the operation result data into the physical register of that physical register number or reads out the operand data from the physical register.

When the write register number designated by the preceding instruction A and the succeeding instruction has the same value a, mutually different physical register numbers b' and b'' are decided with respect to the write register number a for both instructions A and B. Therefore, the instruction B can be executed in parallel with the instruction A before the operation of the instruction A is complete.

When an instruction which instructs to read out a register at the time of decoding thereof, such as an instruction which calls for access to a main memory for storing the operation result or for reading out the operand data and instructs to read out a register storing a data for generating the address therefor, is to be executed, the register number designated by the instruction is used as such and access is made to the logical register group. Accordingly, conversion of the register number becomes unnecessary at the time of decoding, and the speed of the execution of the instruction can be increased.

In this case, if the end of operation of the instruction A is after the end of operation of the instruction B, the operation result of the instruction B is written into the logical register having the number a. When the operation result of the instruction A is thereafter written into the same logical register, the decoding of an instruction to utilize at the time of decoding the operation result of the instruction B cannot be started. In the embodiment of the present invention, therefore, when a plurality of instructions instructing the operation result data into the register of the same number are executed, there is disposed a circuit for controlling the instructions in such a manner that only the operation result data of an instruction decoded last among the operation result data of a plurality of instructions is written into the logical register of this register number. In the example given above, the operation result data of the instruction A is not written.

When the instruction B, or an instruction C between the instructions A and B, designates the register number a in order to utilize the operation result data of the instruction A at the time of decoding, the instruction C cannot utilize the operation result of the instruction A because the operation result of the instruction A is not written into the logical register having the number a. Therefore, if there is a succeeding instruction C which designates the same register number as the register having the number a for storing the operation result of the instruction A in order to utilize at the time of decoding, the writing of the operation result of the instruction B before the operation result of the instruction A must be inhibited.

Accordingly, the embodiment of the present invention includes another circuit which controls the decoding of an instruction so that when such an instruction C exists, decoding of succeeding instructions are inhibited.

BRIEF DESCRIPTION OF THE DRAWINGS

FIG. 2 shows an instruction format used in the embodiment shown in FIG. 1;

FIG. 3 shows an example of an instruction row to be executed in the embodiment shown in FIG. 1;

FIG. 4 shows a time chart for the processing of the instruction row shown in FIG. 3;

FIGS. 12A and 12B are time charts for the processing of the instruction row shown in FIG. 3.

DESCRIPTION OF THE PREFERRED EMBODIMENT

Figure 1:
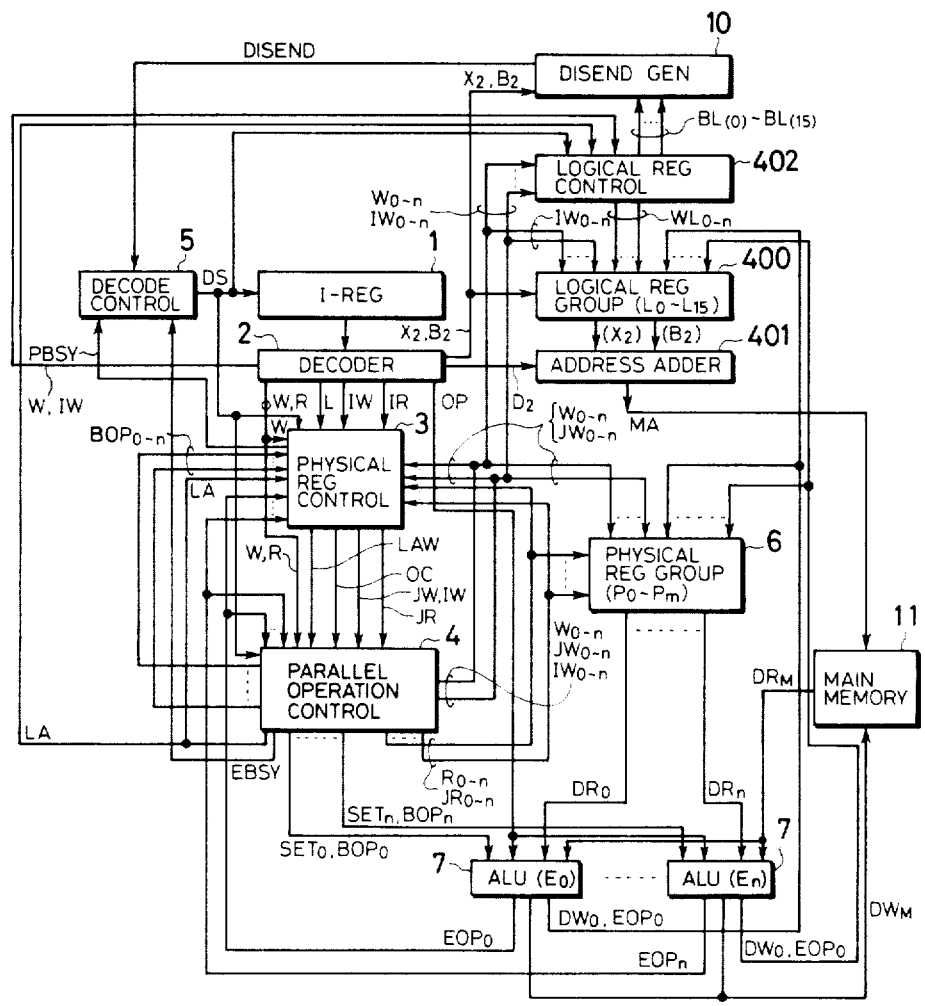
FIG. 1 is a block diagram showing a data processor in accordance with one embodiment of the present invention.

FIG. 1 shows an overall construction of a data processor in accordance with the present invention.

Reference numeral 1 represents an instruction register, which stores therein an instruction for processing. An instruction read circuit for setting an instruction to the instruction register can be constituted in accordance with heretofore known therefore, its illustration as well as its explanation will be omitted. Reference numeral 2 represents a decoder for decoding the instruction inside the instruction register 1. Reference numeral 400 represents a logical register group, which consists of the same number of logical registers $L_0 \sim L_{15}$ as the number of registers that can be designated by 16 instructions. Among the logical register group, the contents of the logical registers represented by an index register number $X_2$ outputted from the instruction decoder 2 and by the base register number B2 are read out and sent to an address adder 401 through signal lines $X_2$ and $B_2$, respectively.

The address adder 401 adds the value of the signal lines $X_2$, $B_2$ to the displacement value $D_2$ outputted from the instruction decoder 2 and generates a memory address MA. The memory address MA is sent to a memory 11. The operand data read out from the memory 11 is sent to ALUs $(E_0 \sim E_n)$7 the through read data line. The operand data written into the memory 11 is sent from ALUs $E_0 \sim E_7$ through the write data line.

Reference numeral 402 represents a logical register control circuit which controls the write of the operation result of ALUs $E_0 \sim E_7$ into the logical register group 400.

Reference numeral 6 represents a physical register group, which consists of a greater number of registers $P_0 \sim P_m$ than the number of registers of the logical register group 400. Since the registers of the physical register group 6 cannot be designated directly by an instruction, access to these registers is controlled by a physical register control circuit 3.

The physical register control circuit 3 converts the logical register numbers IW, IR to the corresponding physical register numbers JW, JR, and provides instructions to read or write from and into the physical registers having the numbers JW, JR. In this case, if different instructions designate the same register, the number of the register can be converted to different physical register numbers by an instruction.

Reference numeral 4 represents an operation control circuit, which supervises the ALUs $E_0 \sim E_n$ and generates various signals for executing a plurality of instructions in parallel.

Reference numeral 5 represents a decode control circuit, which controls decoding of a next instruction for the instruction register 1, or in other words, it sets the next instruction to the instruction register 1.

Reference numeral 10 represents a DISEND generation circuit, which determines whether or not decoding of the instruction in the instruction register 1 is complete, and sends the result to the decode control circuit 5. Unless this DISEND generation circuit 5 generates a DISEND signal representing completion of decoding, the decode control circuit 5 is inhibited to decode the next instruction.

In the conventional apparatuses, general purpose registers for which read and write are directly instructed by an instruction have been employed. In the apparatus shown in FIG. 1, the physical register group 6 and the logical register group 400 are used as if they were a general purpose register group designated by the instruction so as to execute processing required by the instruction. Therefore, in the embodiment of the present invention, an instruction designating the general purpose register number can be executed as will be described next.

FIG. 2 shows an instruction format used in the embodiment of the present invention. In other words, the instruction has the same format as used in computers having conventional general purpose register groups, and consists of an OP portion 10 representing the content of operation, an $R_1$ portion 12 representing a general purpose register number in which a first operand is stored, an $X_2$ portion 14 and $B_2$ portion 16 representing the number of an index register as a general purpose register for generating a memory address in which a second operand is stored and the number of a base register, respectively, and a $D_2$ portion 18 representing displacement for generating the memory address. If the data inside the index register and the data inside the base register are hereby called ($X_2$) and ($B_2$), respectively, the operand address can be given by $$(X_2)+(B_2)+D_2.$$

The operand address is $(7)+(8)+100$ address when $X_2=7$, $B_2=8$ and $D_2=100$.

FIG. 3 shows an example of an instruction row to be processed in the data processor shown in FIG. 1. The first instruction M is an instruction for multiplication of fixed point numbers and instructs to store the product of the data inside a second general purpose register (hereinafter referred to as "GR2") and the data of the $(7)+(8)+100$ address on the memory in the general purpose register GR2. A second instruction ST is a store instruction that instructs to store the data inside the general purpose register GR2 into the $(7)+(8)+200$ address of the memory. A third instruction L is a load instruction that instructs to store the data of the $(7)+(8)+300$ address of the main memory into the general purpose register GR2, and a fourth instruction A adds fixed point numbers, and instructs to store the sum of the data inside GR2 and the data of the $(7)+(8)+400$ address in the general purpose register GR2. A fifth instruction L instructs to store the data of the $(2)+(8)+150$ address of the main memory in the general purpose register GR4. The data inside the general purpose register GR2 used by this instruction is the operation result data of the instruction A immediately before this instruction.

FIG. 4 is a schematic timechart corresponding to when the instruction row shown in FIG. 3 is executed. After being set to the instruction register 1, each instruction is decoded by the decoder 2. When this instruction is one that makes access to the main memory 11, an address calculation is made by the address adder 401 and an operand is read out by making access to the main memory. Thereafter, the register number designated by the instruction is converted to the physical register number and the operand data is read out from the physical register 6 and is sent to the ALU $E_l$ with the operation result being written into the physical register 6 or into the main memory 11. Among the processings described above, FIG. 4 shows only the portions of the instruction decode processing and operation processing.

When the instruction M is set to the instruction register 1 at the start of the cycle C1, the data at the $(7)+(8)+100$ address of the main memory 11 is read out and ALU E0 is actuated. ALU E0 makes calculation in four cycles of from C1 to C4 and the operation result is stored in the logical register L2 and the physical register Pi. Here, symbol Pi represents the number of physical register obtained by conversion of the number 2. In other words, the physical register Pi is used as a general purpose register GR2 designated by the instruction. After the ALU E0 is actuated, the instruction ST to be processed next is set to the instruction register 1 at the start of the next cycle C2 and after decode and address calculation, the next ALU E1 is actuated. In this case, a register for which operand read-out is necessary for the ST instruction is the physical register Pi and its content is the operation result of the preceding M instruction. Therefore, ALU E1 is under the waiting state until the cycle C4, when the operation result of the M instruction is written into the physical register Pi, reads out the physical register Pi at the start of the cycle C5 and stores the operation result in the main memory 11.

Here, the reason why the operand of the ST instruction is read out from the physical register Pi, but not from the logical register L2, is that there is no possibility that a different value (here, the data by a third instruction (L)) is written into the logical register L2 when the ST instruction reads out the register L2.

On the other hand, the L instruction is set to the instruction register 1 at the start of the cycle C3, data of $(7)+(8)+300$ address is read out from the main memory 11 and ALU E2 is actuated. At this time, neither write of the operation result due to the preceding M instruction nor read-out of the operand due to the ST instruction has yet been finished to or from the physical register Pi, which has already been determined for the general purpose register number 2 and into which the memory data designated by the L instruction is to be stored. In the present invention, however, the physical register to be used as the general purpose register 2 into which the operation result of the L instruction is to be stored is a physical register Pj which is different from the physical register Pi. In other words, the physical register control circuit 3 converts the general purpose register number 2 designated by the L instruction to the value Pj, which is different from Pi. As a result, the L instruction is immediately processed in the cycle C3 and the operation result is stored in the physical register Pj and the logical register L2.

The L instruction uses exclusively the ALU E2 only in the cycle C3, while in the cycle C4, the ALU E2 can accept the operation of a succeeding instruction. Next, when the A instruction is set to the instruction register 1 at the start of the cycle C4, the data of the $(7)+(8)+400$ address of the main memory 11 is read out and the ALU E2 is actuated. As a general purpose register GR2 for reading out the operand designated by the A instruction or for storing the operation result, the physical register Pj reallotted for storing the result of the L instruction. The operation of the A instruction is started from the cycle C4 and is finished in the cycle C5, and the operation result is stored in the physical register Pj and in the logical register L2. Next, the second L instruction is set to the instruction register 1 at the start of the cycle 5. In the operation of this L instruction, the logical register L2 is used as a general purpose register GR2 to be used as an index register for determining the (2)+(8)+150 address of the main memory 11.

In the manner described above, the operation of the M and ST instructions and the operation of the L and A Instructions based on the former two instructions can be executed in parallel with one another by a plurality of ALUs by alotting a different physical register number to the same general purpose register number designated by the R1 portions of the M instruction and second L instruction when these instructions are to be operated. Since the address calculation for the last L instruction is made by use of the logical register L2 having a register number equal to the register number 2 designated by the instruction, the change of the register number is not necessary, the processing time becomes short and eventually, the instruction execution cycle can be shortened.

Further, the operation result of the M instruction is outputted in the cycle C4, but the succeeding A instruction also requires write of the operation result data into the general purpose register having the same register number (#2) for the logical register L2 having the register number (#2) designated by the M instruction. Therefore, even if the operation result data of the preceding A instruction has been obtained beforehand, this result data is not written into the logical register L2 but only the operation result of the A instruction is written. Therefore, the data which the second L instruction obtains by reading the logical register L2 in the cycle C5 is the operation result data of the A instruction, and the processing is carried out in the sequence as represented by the instruction row shown in FIG. 3.

Hereinafter, each circuit will be described in detail.

Among the instruction decode data outputted from the instruction decoder 2, the following are necessary for the description of the present invention.

(1) OP:

This is the OP portion of the instruction and represents the content of the operation.

(2) W:

This represents that the instruction is of such a type that instructs the general purpose register to store the result. (Hereinafter, this will be referred to as the "W" type instruction".)

(3) IW:

This represents the number of the register which stores the result in the W type instruction. In this embodiment, the number of general purpose registers that can be designated by the instruction is 16, and they are presented by 0 to 15. Therefore, IW assumes any of these values 0, 1, . . . , 15. Hereinafter, IW will be referred to as "write general purpose register designated by instruction".

(4) R:

This represents that an instruction is one that instructs to read out the content of a general purpose register as the operand or operator (hereinafter referred to as "R type instruction").

(5) IR:

This represents the number of the register designated as a general purpose register by the instruction to read out the operand in the R type instruction. IR also can be any one of the values 0, 1, . . . , 15. Hereinafter, IR will be referred to as the "read general purpose register designated by instruction".

(6) L:

This represents an instruction of such a type that does not instruct to read out the operand from the general purpose register but instructs to write the operation result data into the general purpose register among the W type instructions. (Hereinafter, this will be referred to as the "L type instruction").

(7) $X_2$, $B_2$, $D_2$:

They are an index register number, a base register number and a displacement, respectively.

Among the output of the instruction decoder 2, the signal OP is sent to ALUs $E_0 \sim E_n$, and the signals W, IW, R, IR and L are sent to the physical register control circuit 3. Furthermore, the signals W and R are sent to the parallel operation control circuit 4 and the signals W and IW are sent to the logical register control circuit 402. The signals $X_2$ and $B_2$ are sent to the logical register group 400 and to the DISEND generation circuit 10 while the signal $D_2$ is sent to the address adder 401.

The physical register control circuit 3 converts the write general purpose register number IW and the read general purpose register number IR inputted thereto from the instruction decoder 2 into the corresponding physical register numbers JW and JR and detects whether or not the preceding write instruction for writing the operation result into the physical register $P_{JR}$ designated by the read physical register number JR is being executed and when it detects that the storage of the result of the preceding instruction is not yet complete (this is called "conflict state" wherein the instruction causes operand conflict with the preceding instruction), it outputs an OC signal. The physical register control circuit 3 also produces a PBSY signal for the L type instruction when there is no physical register that is to be allotted afresh.

The signals outputted from the parallel operation control circuit 4 are as follows.

(1) EBSY:

This represents that all ALUs are occupied. This signal is sent to the decode control circuit 5 and inhibits the output of a decode completion signal DS. The DS signal represents that decoding of the instruction set to the instruction register 1 is complete. The DS signal is also inhibited when the PBSY signal described above is outputted from the physical register control circuit 3. When the DS signal occurs and decoding of the instruction is complete the, next instruction is set to the instruction register 1. The DS signal is sent to the physical register control circuit 3, the parallel operation control circuit 4 and the logical register control circuit 402.

(2) SETi (i=0~n):

This signal represents that the operation of a decoded instruction should be made by ALU Ei. The parallel operation control circuit 4 selects an empty ALU among ALUs $E_0 \sim E_n$ and generates a corresponding SETi signal when the DS signal occurs. At this time, ALU Ei accepts the OP portion of the instruction sent from the instruction decoder 2. The SETi signal is sent to the corresponding ALU $E_i$.

(3) JRi (i=0~n):

This signal represents the physical register number of the register which stores therein the input oprand required by the instruction set up to ALU Ei.

The signal JRi is sent to the physical register group 6 and the physical register control circuit 3. The physical register group 6 includes m+1 physical registers $P_0 \sim P_m$. Here, the number (m+1) of the physical registers must be greater than the number (16) of the logical registers $L_0 \sim L_{15}$, and is preferably as great as possible in order to improve the degree of parallelism of the instruction processing. The content of the physical register $P_{JRi}$ represented by JRi is read out from the physical register group 6 and is sent to ALU Ei through the signal line DR.

(4) Operation start signal BOPi (i=0~n):

When the input operand required by the instruction set up to ALU $E_i$ is read out from the physical register $P_{JRi}$, a BOPi signal for indicating that the operation should be started is generated. The generation of the BOPi signal is suspended when the instruction causes an operand conflict with the preceding instruction or when the instruction requires read-out of the memory operand but its read-out is delayed until its arrival. When the generation of the BOPi signal is retarded by the latter cause, its control is effected by the operand read circuit. However, since such a circuit is not necessary for the description of the present invention and since it can be constituted by heretofore known techniques, the circuit is not shown in the drawing and is not further described.

In the description of this embodiment, it is assumed that such a delay of read-out of the memory operand does not exist. As can be appreciated from the description given above, the BOPi signal is generated simultaneously with the SETi signal if no operand conflict exists, and is generated when the operand conflict is solved if the conflict does exist.

The BOPi signal is sent to the ALU Ei and to the physical register control circuit 3.

When the BOPi signal occurs, ALU Ei accepts the input operand sent from the physical register $P_{JRi}$ and starts the operation.

(5) LA:

The signal represents that the ALU to which an instruction is set up is any of $E0 \sim E_n$. This signal is applied to the physical register control circuit 3 and the logical register control circuit.

(6) Wi (i=0~n):

This signal represents that the instruction set up to Ei is the W type instruction. This signal is sent to the physical register group 6, the logical register control circuit 402 and the physical register control circuit 3.

(7) JWi (i=0~n):

When the instruction set up to Ei is the W type instruction, this signal represents the physical register number in which the result is to be stored.

This signal is sent to the physical register group 6 and the physical register control circuit 3.

(8) IWi (i=0~n):

When the instruction set up to Ei is the W type instruction, the signal represents the general purpose register number which is designated by the instruction and in which the result is to be stored.

This signal is sent to the logical register group 400 and the logical register control circuit 402.

ALUs Ei (i=0~n) can execute all the instructions and send the operation result DWi to the physical register group 6 and the logical register group 400. When the operation is complete, ALUs send the EOPi signal representing the completion to the physical register group 6, the logical register group 400, the physical register control circuit 3 and the parallel operation control circuit 4.

If the write type signal Wi is 1 when the operation finish signal EOPi is generated (or if the instruction to be executed by ALU Ei is the W type instruction), the physical register group 6 stores the operation result DWi in the physical register $P_{JWi}$ represented by the write physical register number JWi.

The logical register control circuit 402 stores therein the instruction which is decoded last among a plurality of instructing to store the operation result in each logical register Li, and only when the operation of the instruction decoded last is completed by any of the ALUs Ei, the circuit 402 writes the operation result in that logical register Li. For this reason, the logical register control circuit 402 outputs signals WL 0~n representing whether or not the operation result data of each ALU is to be written.

When the EOPi signal is generated, the logical register group 400 stores the operation result DWi in the logical register represented by the write general purpose register number IWi if the WLi signal is 1.

An ALU busy signal EBSY, a physical register busy signal PBSY and a decode finish signal DISEND are applied to the decode control circuit 5 from the parallel operation control circuit 4, the physical register control circuit 3 and the instruction decoder 2, respectively. The decode control circuit 5 outputs the logical product of the inversion signals of EBSY and PBSY and the signal DISEND as the decode start signals DS. In other words, it outputs the decode start signal DS when the ALU busy signal EBSY and the physical register busy signal PBSY are not sent but when the decode finish signal DISEND is sent.

In other words, the decode start signal DS is outputted when an empty ALU exists, when physical registers that can be allotted afresh exist and when the instruction decode data can be outputted.

Next, the physical register control circuit 3 will be described in more detail with reference to FIG. 5. Reference numeral 500 represents a physical register status control circuit, which has physical register status bits representing the status of m+1 physical registers $P_0 \sim P_m$ in each cycle, and controls the updating of these registers. FIG. 6 shows a further detailed construction of the physical register status control circuit 500. The following four bits exist as the physical register status bits.

(1) storage unfinished bit W(k) 1500 (K=0~m):

This represents the state where a write of the W type instruction allotted to the physical register Pk so as to store the operation result is not yet complete. When the DS signal of this instruction occurs, the bit is 1 and when the storage of the result is complete for the last instruction to store the result in the same physical register Pk among the instructions that have already been decoded, the bit is 0. Control for this operation will be explained as follows.

(2) final storage ALU number LAW(k) (k=0~m):

This represents the ALU to which the instruction decoded last among the instructions to store the operation result in the physical register pk is set up. When the DS signal of the W type instruction for which the write physical register number JW is k occurs, the value of the ALU number LA sent from the parallel operation control circuit 4 is set to LAW(k). Furthermore, W(k) is on at this time.

In FIG. 6, a W(k)·LAW(k) set condition generation circuit 1508 sends set signals to W(k) and LAW(k) having JW=k inside a W flag 1500 and a LAW flag 1502 when the DS signal is on and the W signal is also on. At this time, LA is set to LAW(k) while 1 is set to W(k).

When a succeeding instruction, which instructs to write a succeeding physical register Pk is decoded before the result of a preceding instruction for a preceding physical register Pk, has not yet been written, the value of LAW(k) sets the ALU number for the succeeding instruction. In this manner, the ALU number of the instruction that is decoded last among the instructions which instruct to write the physical register P(k) remains in LAW(k).

On the other hand, when the operation in ALU Ei is complete, the EOPi signal occurs and if the instruction is the W type instruction, the result is written into the physical register $P_{JWi}$ represented by the JWi signal. At this time, if the LAW(JWi) value represents the ALU Ei in the physical register status control circuit 500, the W(JWi) bit is reset to 0 because the last instruction which changes the physical register $P_{JWi}$ is by itself the instruction which has just been operated in the ALU Ei. Therefore, this means that the results of all the instructions for the physical register $P_{JWi}$ have been stored.

Therefore, the W(k)·LAW(k) reset condition generation circuit 1510 resets the bits W(k) and LAW(k) among the W flag 1500 and the LAW flag 1502 when the condition below if 1:

$$\sum_{i=0}^{n} [\overline{EOPi} \cdot (LAW(JWi) = i) \cdot JWi = k]$$

If the value of LAW(JWi) does not represent ALU Ei, a succeeding instruction which changes JWi has already been decoded and hence the W(JWi) remains as such. Here, the succeeding instruction which changes JWi must read out JWi as the input operand (Note 1). Therefore, after the operation of a preceding JWi change instruction and the storage of the operation result have been complete, its operation and storage of the operation result are effected. In other words, since the operation and the storage of the operation result of a plurality of instructions whose operation result are to be stored in the same physical register are always carried out in the conceptual sequence of instruction, W(k) becomes 0 when the storage of the operation result of the last instruction among the instructions whose operation result must be stored in Pk and which have already been decoded, is complete.

(NOTE 1: Among the W type instructions, those instructions which do not designate the general purpose register for storing the operation result as the input operand are defined as the L type instruction (such as the load instruction). Therefore, the succeeding instruction whose operation result is stored in JWi but not in a newly allotted register is not the L type instruction, and hence the general purpose register for storing the operation result is designated also as the input operand.)

(3) busy bit B(k) 1504 (k=0~m):

This represents that the physical register Pk is busy. The term "busy" for the physical register Pk means that read or storage of the operation result from and into the physical register Pk is not yet complete, or the possibility of such operations exists.

When the DS signal of the L type instruction occure, B(k) is on when a physical register is allotted afresh in order to store its operand. For this reason, the physical register number to be allotted afresh is sent as a JWN signal from a later-appearing conversion table control circuit 501 to the B(k) set condition generation circuit 1512 shown in FIG. 6.

The B(k) set condition generation circuit 1512 sets the bit B(k) having JWN=k among the B flag 1504 when the DS signal is on and the L signal is also on.

When the general purpose register number corresponding to the physical register Pk is IW, the L type instruction for storing the result in IW is decoded, and another physical register Pl is allotted afresh to IW in this case. (At this time, the A(k) bit to be described in the next item (4) is on.) In this case, the B(k) is off at the point of time when read-out and the storage of the result for the physical register Pk by all the conceptually preceding instructions with respect to this L type instruction are finished.

In this case, the read-out is completed and the storage of the result from and to the physical register Pk by all the instructions which are preceding instructions to the L type instruction is sent from the parallel operation control circuit 4. Judgement is made by use of signals $R_0 \sim R_n$, $JR_0 \sim JR_n$, $W_0 \sim W_n$ and $JW_0 \sim JW_n$. In other words, suppose the physical register numbers are $JR_{i1}$, $JR_{i2}, \ldots$ for the on signals among the signals $R_0 \sim R_n$, it is possible to determine that the read-out by all the preceding instructions from the physical register Pk have been complete if there is no number among them that corresponds to the number k of the physical register Pk. Similarly, suppose the write physical register numbers are $JW_{i1}$, $JW_{i2}, \ldots$ for the on signals among the signals $W_0 \sim W_n$, it is possible to determine that the storage of the result has been complete by all the preceding instructions into the physical register Pk if there is no number among them that corresponds to k. This condition is determined by a B(k) reset condition generation circuit 1514 shown in FIG. 6.

The B(k) reset condition generation circuit 1514 sets the bit B(k) in the B flag 1504 when the condition below is 1:

$$\sum_{i=0}^{n} Ri(JRi = k) \cdot \overline{\sum_{i=0}^{n} Wi \cdot (JWi = k)}$$

Reference by all the preceding instructions to the content of the physical register whose busy bit is off has already been complete. Therefore, when a new physical register is allotted to the L type instruction, the physical register may be selected from those whose busy bit is off.

(4) Assign bit A(k) 1506 (k=0~m):

This bit represents that the physical register is under the assign state. The term "assign state" for the physical register Pk means the state where the physical register is busy and moreover, another physical register Pl is allotted afresh to the L type instruction which requires to write into a general purpose register having the same register number as that (IW) of the general purpose register which is made to correspond to the physical register Pk. The bit A(k) is on when the physical register Pk is busy (that is, when the bit B(k) is on) and when another physical register is allotted afresh to the L type instruction which requires to write into a general purpose register having the same register number as IW of the general purpose register which is made to correspond to the physical register Pk, as described in item (3). Therefore, when the L type instruction is decoded, the old physical register number (representing the physical register whose assign bit is to be on) that has corresponded to IW is sent as the JW0 signal from a later-appearing selector 503 to the A(k) set condition generation circuit 1516 shown in FIG. 6. The A(k) set condition generation circuit 1516 sends the set signal to the bit B(k) which has JW0=k and whose B(k) is on inside the B flag 1504.

When the physical register Pk is no longer busy (that is, when B(k) is off), A(k) is also off. Therefore, when B(k) is off, the A(k) reset condition generation circuit 1518 in FIG. 6 outputs the reset signal to the bit A(k) inside the A flag 1506.

In the processes described above, the DS signal from the decode control circuit 5, the L, W, IW, IR signals from the instruction decoder 2, signals $R_0 \sim R_n$, $JR_0 \sim JR_n$, $W_0 \sim W_n$, $JW_0 \sim JW_n$ and LA from the parallel operation control circuit 4, the $EOP_0 \sim EOP_n$ signals from the ALUs $E_0 \sim E_n$, the JW signal from the selector 504 inside the physical register control circuit 3 and the JW0 signal from the selector 503 inside the physical register control circuit 3 are applied to the physical register status control circut 500.

The conversion table 502 consists of registers $JWF_0$, $JWF_1$, ..., $JWF_{14}$, $JWF_{15}$ for storing the physical register numbers corresponding to the general purpose register numbers 0, 1, ..., 14, 15, respectively.

Figure 7:
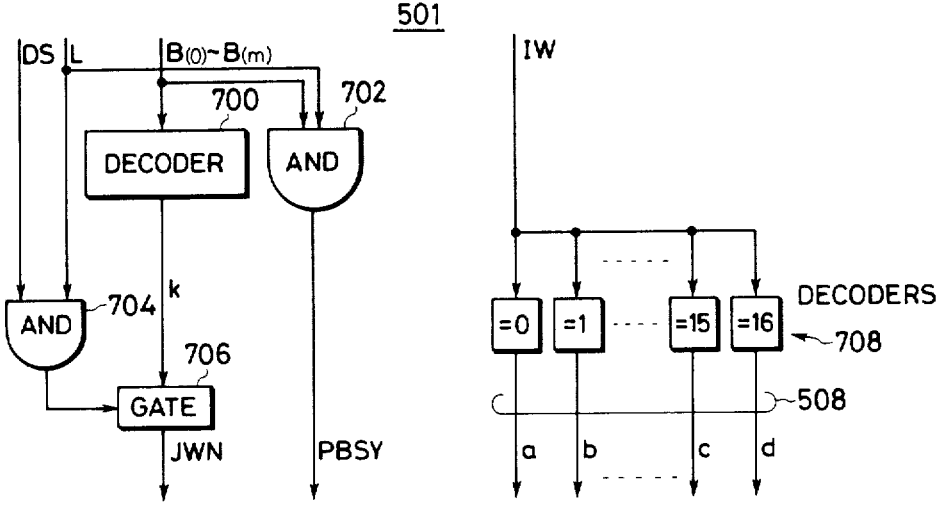
FIG. 7 shows an internal construction of a conversion table control circuit 501 shown in FIG. 5.

Next, the internal construction of the conversion table control circuit 501 will be described with reference to FIG. 7.

When the L type instruction is decoded, the conversion control circuit 501 selects a physical register to be allotted afresh among the physical registers which are not busy, and outputs the number JWN of that physical register. In other words, it selects one of the off bits from the busy bits $B(0) \sim B(m)$ by the decoder 700 in accordance with a suitable method when both the input DS signal to the AND gate 704 and the L signal are on, and outputs the number as JWN from the gate 706. Furthermore, the conversion table control circuit 501 sends the write signal 508 to the register JWFi (i=IW) by the decoder group 708 which decodes the general purpose register number IW of the L type instruction among JWF0~6 in the conversion table 502, and write this JWN value. The storage of this JWN is made at the time of completion of the decode of the L type instruction. Therefore, the stored value is used for decoding after the next instruction and so on.

When the L signal inputted to the AND gate 702 of the conversion table control circuit 501 is on and when all the bits $B(0) \sim B(m)$ are on, that is, when all the physical registers P0~Pk are busy and any physical registor to be allotted afresh cannot be selected, the AND gate 702 turns on the PBSY signal and sends it to the decode control circuit 5 in order to suspend decoding of the L instruction. As described already, the decode control circuit 5 suspends the generation of the DS signal for the L type instruction at this time until PBSY becomes OFF.

Figure 5:
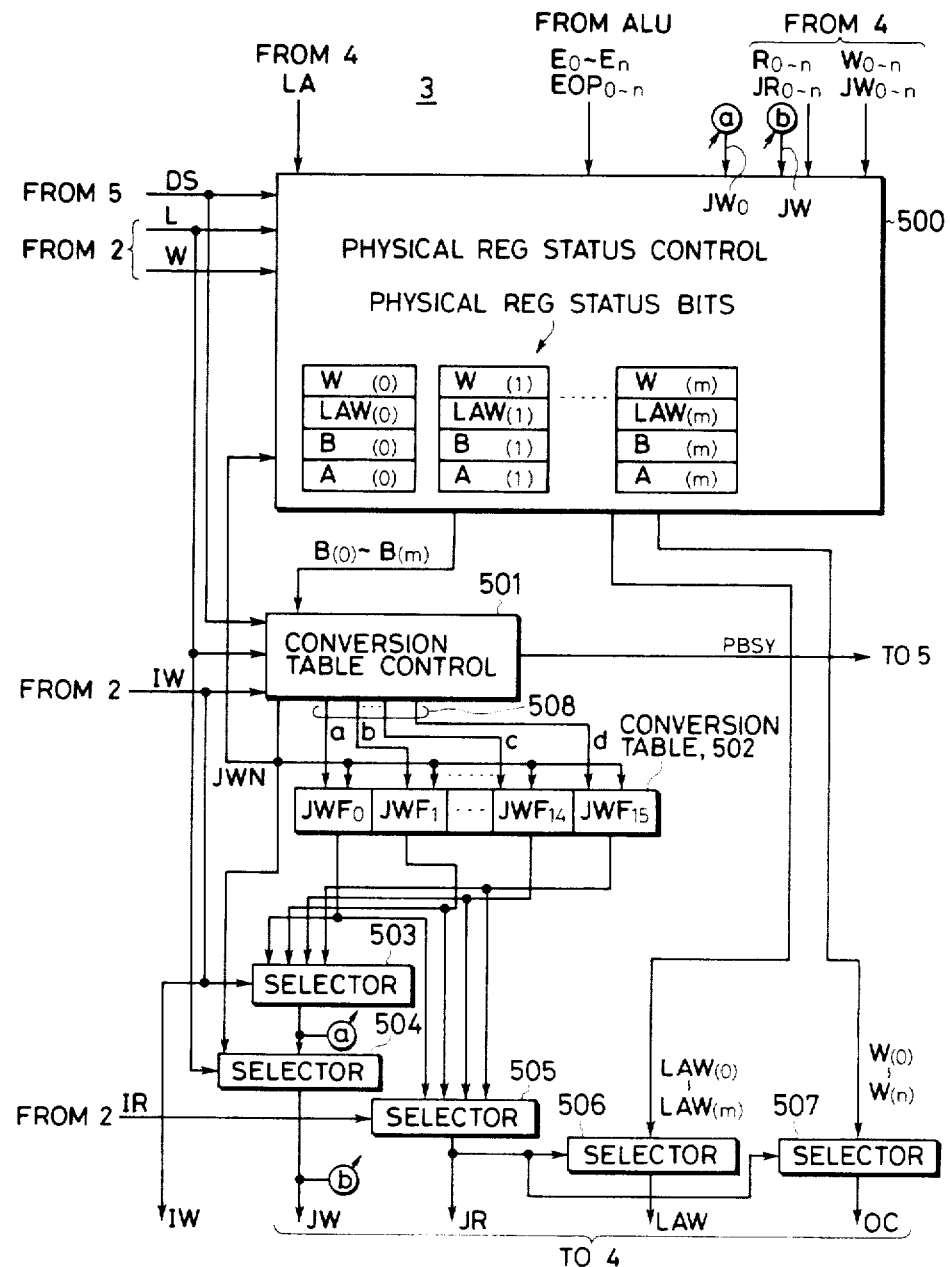
FIG. 5 shows a detailed construction of a physical register control circuit of FIG. 1.
Figure 6:
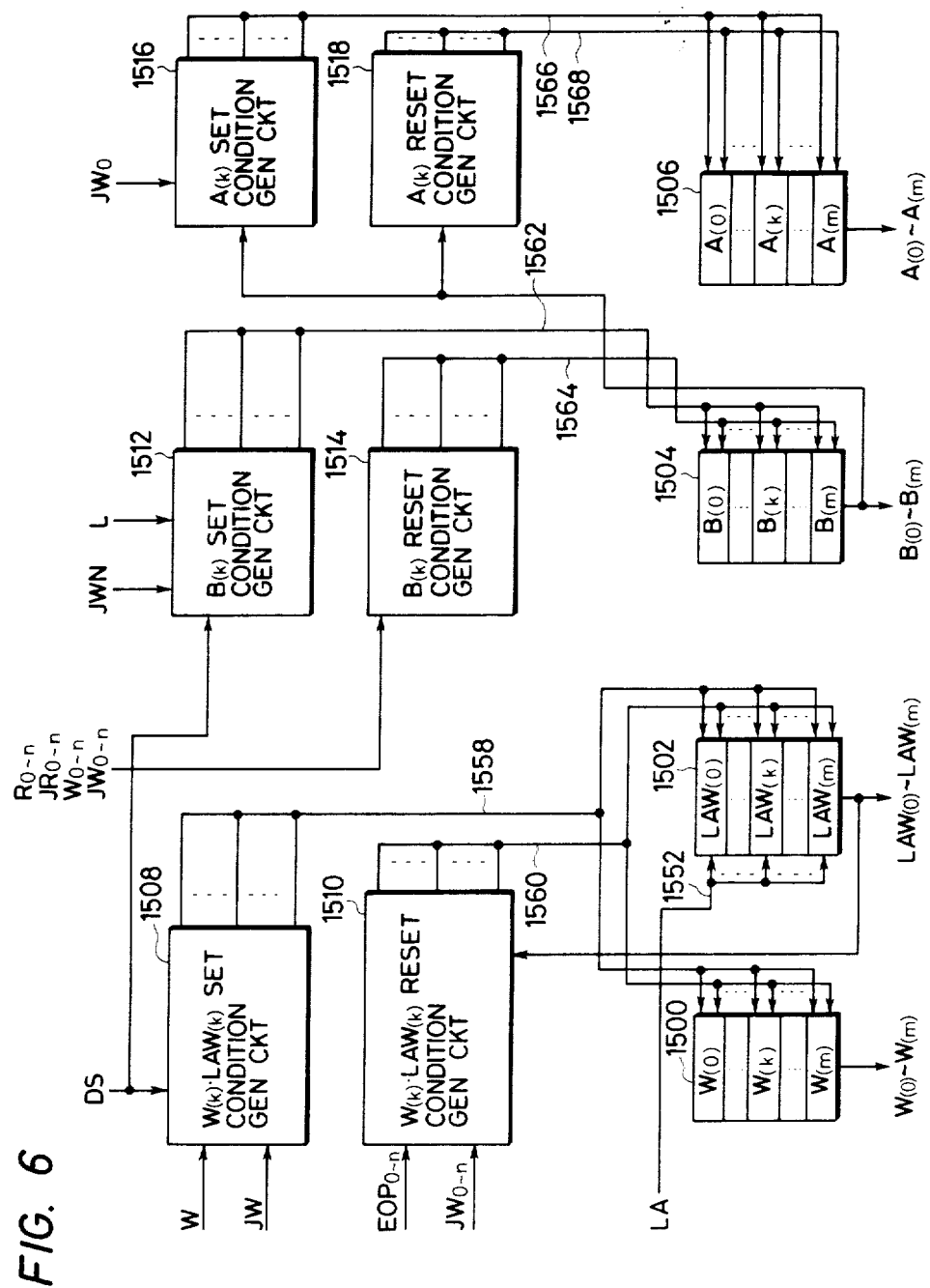
FIG. 6 shows an internal construction of a physical register status control circuit (500) shown in FIG. 5.

In FIG. 5, the selector 503 outputs the physical register number JW0 which is made to correspond to the write general purpose register number IW for the instruction that is being decoded. For this reason, the contents of JWF0~15 are applied in addition to the number IW. In the L type instruction, JW0 represents the number that has so far been allotted to IW.

The selector 504 selects JWN when the L signal is ON and JW0 when the L signal is OFF, and produces it as the JW signal. Therefore, the JW signal represents the number of the physical register to store the result of instruction for all the W instructions whether they are the L type instruction or not.

The selector 505 outputs the physical register number JR which is made to correspond to the read general purpose register number IR In the R type instruction. Therefore, it receives the contents of JWF0~15, selects the signal among them which is represented by IR and outputs it as JR.

The selector 506 outputs the number LAW of ALU which operates the instruction which is in turn to be written last into the physical register $P_{JR}$ which has the number JR and is to be read out by the instruction for the R type instruction. Therefore, it selects LAW(JR) represented by the output JR of the selector 505 among the last storing ALU Number bits LAW(0)~LAW(m), and outputs it as LAW.

The selector 507 outputs an OC signal representing the occurrence of an operand conflict. Therefore, it selects W(JR) represented by the output JR of the selector 505 among storage unfinished bits W(O)~W(m) and outputs it as OC.

Figure 8:
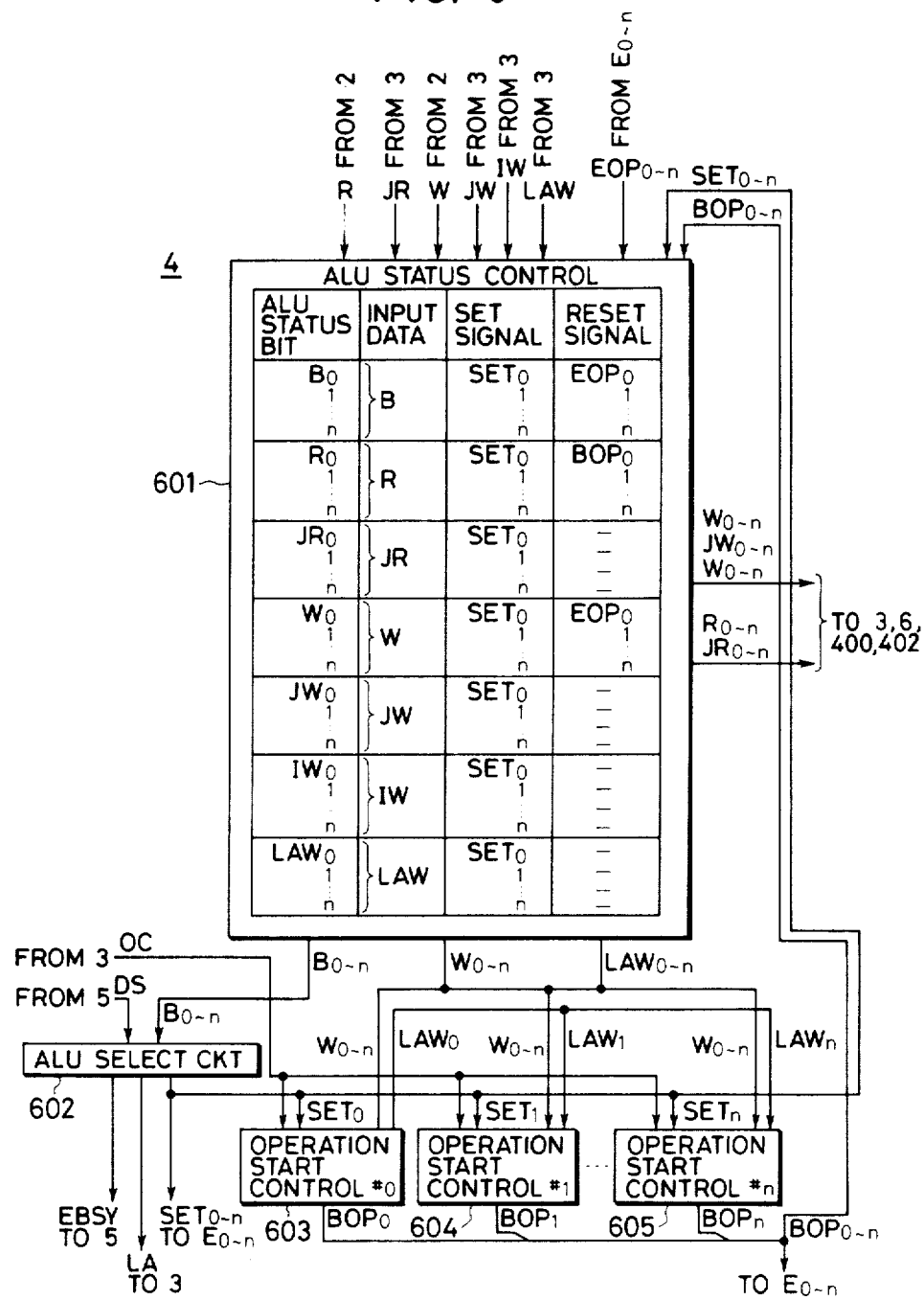
FIG. 8 shows a detailed construction of a parallel operation control circuit (4) shown in FIG. 1.

Next, the detailed construction and operation of the parallel operation control circuit 4 will be explained with reference to FIG. 8.

Reference number 601 represents an ALU status control circuit. This circuit has seven kinds of ALU status bits representing the status of each of n+1 ALUs $E_0 \sim E_n$ in each cycle, and controls updating of them. The ALU status bits are as follows. Symbol i represents the numerals 0 to n. In FIG. 8, an input signal to each flag, a signal instructing the set of this input and a signal resetting each flag are shown in the block of the circuit 601.

(1) busy bit Bi:

This represents that ALU Ei is busy. The term "busy" means the period from set-up of the instruction that has been decoded to ALU Ei (that is, after the generation of the SETi signal) until the end of execution of the instruction (that is, until the generation of the EOPi signal).

The Bi bit is turned on by the SETi signal and off by the EOPi signal.

(2) read unfinished bit Ri:

This represents the status where an instruction calling for the of a register is set up to Ei but the read-out operation is not yet complete.

Ri is turned on at the time of set-up (at the turn-on of the SETi signal) of the R type instruction (that is, when the R signal is on) is turned on, and is off at the start of operation of this instruction (when the BOPi signal is on).

(3) read physical register number JRi:

This represents the physical register number to be read out in the R type instruction set up to Ei. The value of the JR signal is taken at the time of generation of the SETi signal and is changed to JRi.

(4) storage unfinished bit Wi:

This represents the status where an instruction for storing the result in the register is set up to Ei, but the storage is not yet complete.

Wi is turned on when the W type instruction is set up (when the W signal is on and the SETi signal is on), and is turned off when the write of the result of this instruction is complete (when the EOPi signal is on).

(5) storage physical register number JWi:

This represents the physical register number which stores the result in the W type instruction set up to Ei. It takes the value of the JW signal at the time of generation of the SETi signal and changes it to JWi.

(6) storage general purpose register number IWi:

This represents the general purpose register number which stores the result in the W type instruction set up to Ei. It takes the value of IW at the time of generation of the SETi signal and changes it to IWi.

(7) last storing ALU number LAWi:

This represents the ALU number which executes the operation of the instruction whose result is last stored into the register which the R type instruction set up to Ei must read.

It takes the value of the LAW signal at the time of generation of the SETi signal and changes it to LAWi.

Figure 9:
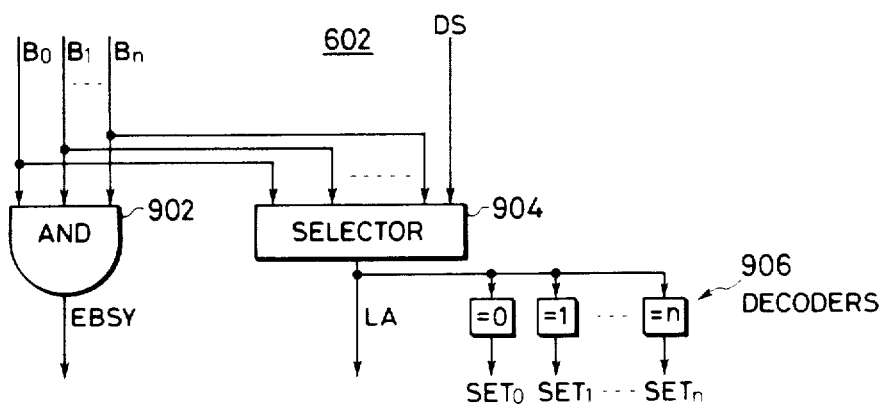
FIG. 9 shows an internal construction of an ALU selection circuit (602) shown in FIG. 8.

Reference number 602 represents an ALU selection circuit and its detail is shown in FIG. 9. When all the busy bits B0~Bn inputted thereto are on, the ALU selection circuit 602 turns on the aforementioned EBSY signal from the AND gate 902, selects one of the ALUs which are not busy (with Bi being on) by the selector 904 when decoding of the instruction is complete and the DS signal is inputted (which ALU is hereby assumed to be Ei), outputs its number i as the LA signal, decodes the signal LA by the decoder group 906 and outputs the SETi signal to be decoded for the number i.

Reference numerals 603 to 605 represent operation start control circuits which are disposed for respective ALUs, and only those which correspond to ALUs E0, E1 and En are shown in the drawing.

When the instruction is set up to Ei (that is, when the SETi signal is on), the operation start control circuit #i generates immediately the operation start signal BOPi if the operand conflict signal OC sent from the physical register control circuit 3 is off, and generates the BOPi signal when the OC signal is turned off if the OC signal is on. The reason why the OC signal is off when the SETi signal is on is that the operand read out from the physical register $P_{JRi}$ represented by $JR_i$ is effective because no operand conflict occurs between the preceding instruction when the instruction is set up to Ei, and hence the operation can be started immediately in ALU Ei by use of the operand. On the contrary, if OC is on, it represents that the operand conflict occurs between the preceding instruction and the present instruction when the latter is set up to ALU Ei. Therefore, the storage unfinished bit WJ of ALU Ej to which an instruction, whose operation result is to be stored last in the ALU generating the operand data required by the instruction, that is, in the physical register $P_{JRi}$ represented by JRi (the number j being the LAWi signal and being sent from the ALU status control 601), and when this bit Wj is turned off, the BOPi signal is generated.

Figure 10:
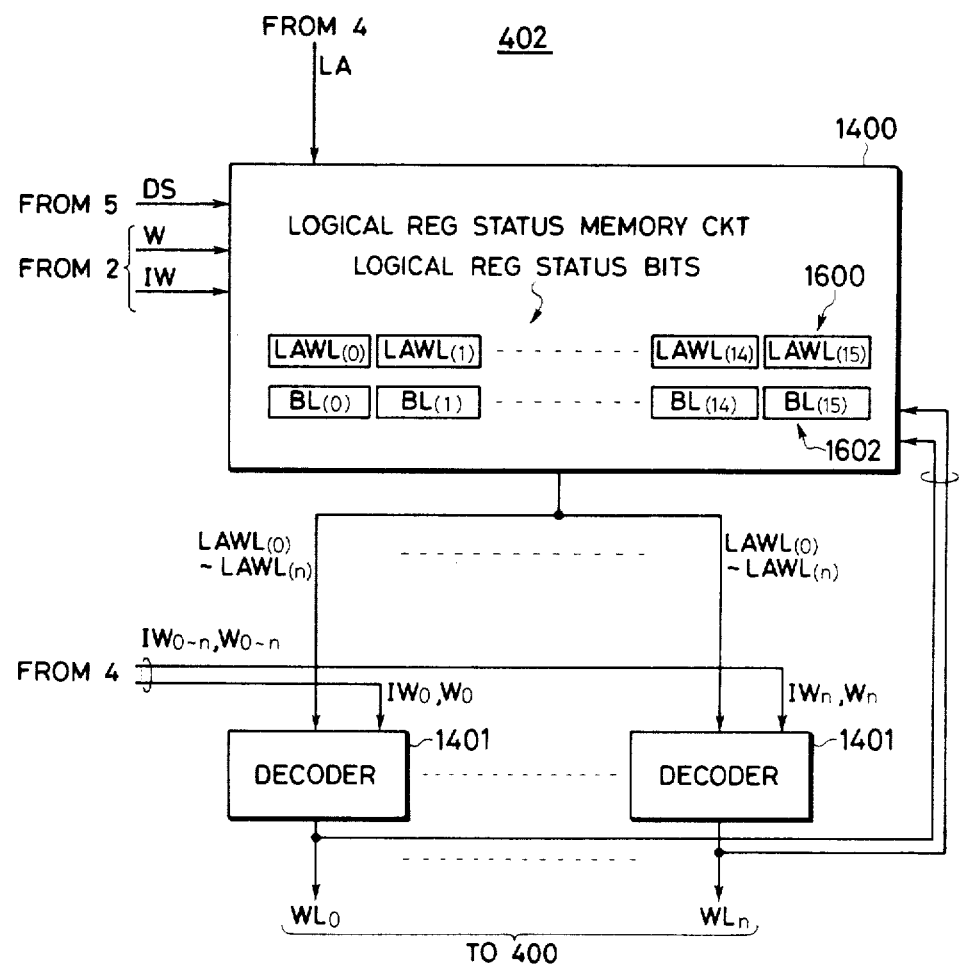
FIG. 10 shows an internal construction of a logical register control circuit (402) shown in FIG. 1.
Figure 11:
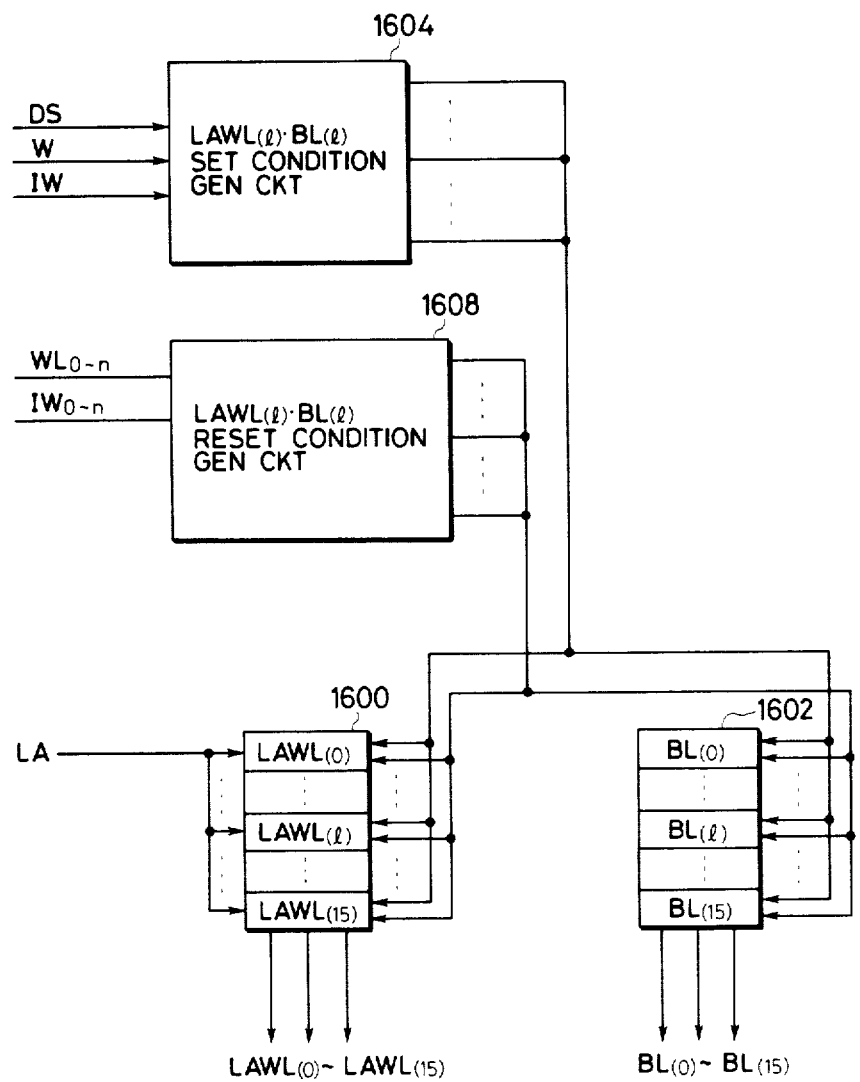
FIG. 11 shows an internal construction of a logical register status memory circuit 1400 shown in FIG. 10.

Next, the logical register control circuit 402 will be described in further detail with reference to FIG. 10. Reference numeral 1400 represents a logical register status memory circuit. This circuit 1400 has logical register status bits representing the status of 16 logical registers and updates them. FIG. 11 shows in further detail the construction of the logical register status memory circuit 1400. The following two kinds of bits exist as the logical register status bits.

(1) final storing ALU number LAW L(l) 1600 (l=0~15):

This represents the ALU number to which an instruction which is decoded last among those whose operation results are to be stored in the logical register Ll is set up. When the DS signal of the W type instruction having the write general purpose register number IW of l occurs, the value of the ALU number LA sent from the parallel operation control circuit 4 is set to LAWL(l) 1600.

Therefore, a LAWL(k)·BL(l) set condition generation circuit 1604 shown in FIG. 11 sends a set signal to LAWL(l) having IW=l when the DS signal is on and the W signal is also on. When a succeeding instruction for the write of the same logical register Ll is decoded before the result of a preceding instruction to the logical register Ll has not yet been complete, the value of ALWL(l) sets the ALU number to the succeeding instruction. According to this arrangement, the ALU number for the last decoded instruction among the instructions for the write to the same logical register Ll remains in LAWL(l).

On the other hand, the BOPi signal rises at the end of the operation in ALU Ei. If the instruction is the W type instruction, the operation result is about to be written into the logical register $L_{IWi}$ represented by the IWi signal. At this time, among the logical register status bits, the bit corresponding to the logical register number i represents ALU Ei, and whether the instruction is the W type instruction or not is examined by the decoder group 1401, the decoders of which are disposed in such a manner as to correspond to respective ALUs. In other words, if the value of LAWL(IWi) represents Ei, the WLi signal is set to 1 because the last instruction for changing the logical register IWi is the instruction itself that has just been finished in Ei. Therefore, the logical register IWi is made to store the operation result. If the value of LAWL (IWi) does not represent Ei, the succeeding instruction for changing IWi has already been decoded; hence, the WLi signal is set to 0. In this case, the operation result is not stored in the logical register IWi.

(2) logical register busy bit BL(l) 1602 (l=0~15):

This represents that the operation result is not yet stored for the instruction which is decoded last among the instructions whose operation results are to be stored in the logical register. When the DS signal of the W type instruction for which the write general purpose register number IW is l occurs, the bit is turned on. Therefore, the set condition is inputted to BL(l) from the LAWL(l) BL(l) set condition generation circuit 1604 shown in FIG. 12. BL(l) is turned off when the operation result is stored in the logical register. This condition is satisfied when the WLI signal is 1 for the logical register IWi as described in the item (1) of "last storing ALU number LAWL(l)". Therefore, the reset condition is imputted to BL(l) from the LAWL(l)·BL(l) reset condition generation circuit 1608 shown in FIG. 11.

Next, the DISEND generation circuit 10 (shown in FIG. 1) will be explained. The DISEND signal is turned ON when the contents of the index register and base register represented by an instruction in the instruction register 1 are determined. As described already, logical registers $L_{x2}$, $L_{B2}$ are used as the index register having the number $X_2$ and the base register having the number $B_2$, respectively. Therefore, this circuit 10 generates the DISEND signal when the bits BL(0)~BL(15) from the logical register control circuit 402 and both BL($X_2$) and BL($B_2$) are 0 due to $X_2$, $B_2$ from the instruction decoder are 0.

[Explanation of the processing operation of instruction row]

A more detailed operation of the processor when the instruction row consisting of the five instructions shown in FIG. 3 described above will be explained with reference to FIGS. 12A and 12B. In these diagrams, the abscissa represents the time using one cycle as a unit and shows a cycle C0 immediately before a first instruction M is set to the instruction register 1 up to a cycle C5 in which processing of all four instructions has been complete and decoding of the fifth instruction is started. The ordinate represents the registers or signal lines inside the processor, and shows their values at each time in each of the cycles C0 to C5 and the correspondence of the values to the processing of instructions by use of squares and their combinations.

It will be assumed that in the cycle C0, the numbers 0 to 15 corresponding to the physical registers 0 to 15 are set to the registers JWF0 to 15 inside the conversion table 502. Therefore, it will also be assumed that the busy bits $B(0\sim15)$ of the physical registers P0 to P15 are on, the busy bits $B(16\sim m)$ of the physical registers P16 to Pm are off, and all the busy bits B0 to Bn ALUs $E0 \sim En$ are off.

It will be assumed that the M instruction is set to the instruction register 1 in the cycle C1. Hereinafter, the operation relating to this M instruction will be described. Decode is made by the instruction decoder 2 in C1, the W, R signals are on, the value 2 is applied to the write general purpose register number IW and the read general purpose register number IR, and the values 7, 8 and 100 are applied to $X_2$, $B_2$ and $D_2$, respectively.

The contents $(L_7)$, $(L_8)$ are read out from the logical register group 400 and the address adder 401 determines the operand address $(L_7)+(L_8)+100$.

In the physical register control circuit 3, the selectors 503, 504 select the physical register number 2 stored in the register JWF2 in accordance with the value 2 of the write general purpose register number IW and output it as the signal JW. Similarly, the selector 505 reads out the physical register number 2 inside the register JWF2 in accordance with the value 2 of the read general purpose register number IR and outputs it as the JR signal. For ease of description, it will be assumed that the EBSY, PBSY signals are not turned on at all times during the processing of the instruction row described above and hence the decode control circuit 5 immediately turns on the DS signal to indicate decode completion of the M instruction.

The selector 507 reads out the storage unfinished bit W(2) for the physical register P2, and since this is off in the cycle C1 before being changed by the M instruction, the OC signal is turned off.

The ALU selection circuit 602 selects ALU E0 as an empty ALU in response to the DS signal, outputs the number 0 of this ALU as LA and generates the SET0 signal.

The logical register control circuit 402 stores the ALU number 0 in LAWL (2) on the basis of the value of the IW signal and the value (0) of the LA signal in response to the DS signal and the W signal in C1.

In the operation start control circuit #0, since the OC signal relating to the SET0 signal of the M instruction is off in C1, the circuit immediately generates the BOP0 signal.

The ALU status control circuit 601 turns on the SLU status bits B0, W0, R0 in response to the SET0 signal and stores the values of the JW, IW and JR signals, i.e., 2, 2 and 2, in the status flags JW0, IW0 and JR0 respectively. The operation of the M instruction requires the period from C1 to C4, and the EOP0 signal representing the end is generated in C4. In the mean time, the busy bits B0 and W0 of ALU E0 are on and the values 2 and 2 are kept held as the values of the flags JW0 and IW0. When the operation is complete, the result data DW0 is written into the physical register P2 represented by the register JW0 in synchronism with the EOP0 signal. However, since LAWL(2) is 2, the result data DW0 is not written into the logical register L2. This is because an instruction which is newer than the M instruction to instruct the write to the logical register L2 has already been decoded.

In the physical register control circuit 3, the status bit W(2) of the physical register P2 is on in C1 and the number 0 representing ALU to which M is set up is applied to LAW(2). They are held until C4 in which the EOP0 signal of the M instruction is generated.

A next ST instruction is set to the instruction register 1 in C2 in response to the occurrence of the decode completion signal DS of the M instruction. Hereinafter, the operation relating to the ST instruction will be explained. In C2, the ST instruction is decoded by the instruction decoder 2, the R signal is ON and the read general purpose register number IR becomes 2. In the physical register control circuit 3, the value 2 of the register JWF2 is read out by the selector 505 in accordance with the value 2 of the read register number IR, and is outputted as the JR signal. As to the ST instruction, the decode control circuit 5 turns ON immediately the DS signal and declares decode completion. Since the W(2) bit is turned on by the M instruction at the start of C2, the OC signal is turned on in C2. The ALU section circuit 602 selects E1 as an empty ALU in response to the DS signal in C2, outputs this number to the LA signal and generates also the SET1 signal.

The operation start control circuit #1 suspends the generation of the BOP1 signal because the OC signal relating to the SET1 signal of the STD instruction is on.

In the ALU status control circuit 601, B1 and R1 are turned on in response to the SET1 signal, and sets the values of the JR signal and LAW signal E0 to JR1 and LAW1, respectively. In processing the ST instruction in the cycles from C3 and so on, the completion of the preceding M instruction must be supervised. Namely, the storage unfinished bit W0 of ALU E0 is supervised in accordance with the ALU number 0 stored in LAW1 and in the cycle C5 in which this is turned off it is determined that the operand conflict is solved and the BOP1 signal is generated. The operation of the ST instruction is completed in one cycle, and the EOP1 signal is immediately generated in C5. In the meantime, the busy bits B1 and R1 of ALU E1 are on, and the values 0 and 0 are kept as the values of JR1 and LAW1.

A next L instruction is set to the instruction register 1 in response to the occurrence of the decode completion signal DS of the ST instruction. Hereinafter, the operation relating to the L instruction will be explained. In C3, decode is made by the instruction decoder 2, the L and W signals are on, the value 2 is applied to IW and the values 7, 8 and 300 are applied to $X_2$, $B_2$ and $D_2$, respectively.

(7) and (8) are read out from the logical register group, and the address adder determines the operand address $(7)+(8)+300$. In the physical register control circuit 3, the selector 503 reads out the value 2 stored in JWF2 in accordance with the value 2 of IW, and the value of the JW0 signal is set to 2. In the conversion table control circuit 501, on the other hand, since the DS signal and the L signal are on, off bits are selected from the busy bits $B(0) \sim B(m)$ and the physical register number is outputted as the JWN signal. It will be hereby assumed that $B(16) \sim B(m)$ are off and the number 16 of the physical register P16 having the smallest number among them is outputted as the JWN signal.

Since the L type signal is on in C3, the selector 504 outputs the value 16 of the JWN signal as the JW signal.

As to the L instruction, too, the DS signal is immediately generated in C3. The ALU selection circuit 602 selects ALU E2 as an empty ALU in response to this DS signal, outputs the number 2 as the LA signal and generates also the SET2 signal. Since the L instruction does not require the read of the registers, the OC signal is not turned on. Since the OC signal relating to the SET2 signal of the L instruction is off in C3, the operation start control circuit #2 immediately generates the BOP2 signal.

In the logical register control circuit 402, the value 2 is stored in LAWL(2) in C3 on the basis of the value 2 of the IW signal and the value 2 of the LA signal in response to the DS signal and the W signal.

In the ALU status control circuit 601, the bits B2, W2 are turned on in response to the SET2 signal and the value 16 of the JW signal and the value 2 of the IW signal are stored in the registers JW2 and IW2, respectively. Since the operation of the L instruction is completed in one cycle, the EOP2 signal is generated in C3. The result data DW2 is written into the physical register P16 represented by JW2 ($=16$) and into the logical register L2 represented by IW2 ($=2$) in response to the signal EOP 2. The busy bits B2 and W2 of ALU E2 are turned on in C3.

In the physical register control circuit 3, the status bit W(16) of the physical register P16 represented by the JW signal is turned on in C3 and the number 2 representing the ALU to which the L instruction is set up, as the value of the LA signal is applied. They are held for only one cycle because the L instruction immediately generates EOP2 in C3. In C3, too, the assign bit A(2) of the physical register P2 represented by the JW0 signal is turned on. Furthermore, at the end point C3, the number 16 of the physical register allotted afresh to the logical register L2 is set to JWF2 represented by the value 2 of the IW signal.

A next A instruction is set to the instruction register in response to the occurrence of the decode completion signal of the L instruction. Hereinafter, the operation relating to this A instruction will be explained. In C4, decode is made by the instruction decoder 2, the W, R signals are turned on, the general purpose register numbers IW, IR become 2 and the values 7, 8 and 400 are applied to $X_2$, $B_2$ and $D_2$, respectively.

The contents (L7), (L8) of the logical registers L7, L8 are read out from the logical register group 400, and the address adder 401 determines the operand address (L7)+(L8)+400. In the physical register control circuit 3, the selectors 503 and 504 read out the value 16 of the register JWF2 in accordance with the value 2 of IW and use it as the value of the JW signal. Similarly, they read out the value 16 of the register JWF2 in accordance with the value 2 of IR. As to the A instruction, too, the DS signal is immediately turned on. The W(16) bit at the start of C4 is OFF because the operation result of the L instruction has already been written in the preceding cycle C3. For this reason, the OC signal is OFF in C4. The ALU selection circuit 602 selects ALU E2 as an empty ALU in response to the DS signal in C4, outputs this number to the LA signal and generates also the SET2 signal.

In the operation start control circuit #2, it generates immediately the BOP2 signal because the OC signal of the A instruction is OFF in C4. The logical register control circuit 402 stores the value 2 in LAWL(2) on the basis of the value 2 of the IW signal and the value 2 of A in response to the DS signal and the W signal in C4. In the ALU status control circuit 601, B2, W2 and R2 are turned on in response to the SET2 signal, and the values 16, 16 and 2 of the JR, JW and IW signals are stored in JR2, JW2 and IW2, respectively. Since two cycles are necessary for the operation of the AD instruction, the EOP2 signal is generated in the cycle C5. In the meantime, the values of B2, W2, JW2 in ALU E2 are kept. The operation result DW2 is written into the physical register represented by JW2 ($=16$) and into the logical register represented by IW2 ($=2$) in synchronism with EOP2.

In the physical register control circuit 3, the status bit W(16) of the physical register P16 represented by the JW signal is turned on in C4 and the value 2 of the LA signal is set to LAW(16). These values are held until the EOP2 signal of the AD instruction is generated in C5.

A next L instruction is set in C5 to the instruction register 1 in response to the decode completion signal DS of the A instruction. In C5, decode is made by the instruction decoder 2, the L, W signals are turned on, IW becomes 4, and $X_2$, $B_2$ and $D_2$ become 2, 8 and 150, respectively. The contents (L2), (L8) of the logical registers L2, L8 are read out from the logical register group 400, and the address adder 401 determines the operand address (L2)+(L8)+150.

Thereafter, this L instruction is processed in the same way as the L instruction set to the instruction in C3.

In C5, on the other hand, when the BOP1 signal of the ST instruction is generated, reference to the physical register P2 is all completed. Therefore, the busy bit B(2) and the assign bit A(2) are turned off, so that the physical register P2 is empty in cycles after C5.

The five instructions are processed in the manner described above. In the meantime, processing of the M, ST instructions is carried out in parallel with processing of the L, A, L instructions.

Thus, the register read-out for each instruction is carried out by the logical register for the address addition during decode and by the physical register during the operation. Therefore, there is no conversion from the logical register to the physical register during decode; hence, no increase in the decode time due to the conversion time exists. The machine cycle time which is the sum of the decode time and the operation time does not increase, either.

As described above, a succeeding instruction is set to the instruction register 1 only when the DS signal of a preceding instruction occurs. Therefore, if decode completion of the preceding instruction is delayed for some reason or other (or the occurrence of the DS signal is delayed), decoding of the succeeding instruction never occurs. This means that decoding is effected sequentially.

Assume that an instruction to read out a register b enters between an M instruction and a first L instruction during decode; then, the storage of the operation result of the M instruction is behind the storage of the operation result of the L instruction, the intermediate instruction may appear as if it read out the operation result of the L instruction. However, as described above, since decode is always effected sequentially, the decode of the first L instruction is not completed before decode of the intermediate instruction is completed, and the storage of the operation result due to this L instruction never occurs. Therefore, since the intermediate instruction always reads out the operation result of the M instruction during decode, such a problem does not occur.

Though the embodiment described above illustrates the case where a plurality of instructions are executed in a non-pipeline system, the embodiment is also effective for the case where processing is carried out in a pipeline system.

The present invention can eliminate the parallel processing inhibition factor resulting from re-use of the register in a plurality of instructions by disposing about n physical registers when the maximum number of instructions that can be processed in parallel with one another is M and the register change instruction number among them is n. In contrast, the CDB system requires about 2N. Therefore, the present invention can drastically reduce the logic scale. Furthermore, when the operation results are simultaneously obtained for M instructions, the time necessary for transferring the results to the instructions requiring them is M cycles in the CDB system but is only one cycle in the present system. Therefore, the present invention can realize a high speed operation.

Since the operation result of an instruction is written into both the logical and physical registers, a succeeding instruction reads out the result from the logical register during decode and from the physical register at other times. Therefore, conversion from the logical register to the physical register during decode is eliminated and the increase in the decode time due to the conversion time, and eventually in the machine cycle time, can be prevented.

What is claimed is:

1. A data processor comprising:
    a main memory;
    a plurality of operation means connected to said main memory for executing instructions;
    decoding means for sequentially decoding instructions;
    a group of first registers connected to said decoding means and including a number of registers equal to a maximum number of registers that can be designated by said instructions;
    address generation means for generating an address to access said main memory based on data read out from at least one of said group of first registers having a register number designated by an access instruction which has been decoded by said decoding means, said address generation means being connected to a group of second registers;
    said group of second registers being connected to a plurality of said operation means and including a number of registers greater than said maximum number of registers that can be designated by said instructions;
    allotting means connected to said decoding means for allotting one register of said group of second registers to be used as a register having a designated register number among all of the registers of said group of second registers when said decoding means decodes an instruction designating a register number of a register for either reading out an operand data or for writing an operation result data;
    said allotting means including means for reallocating said group of second registers when a succeeding instruction designates the same register number for writing an operation result data as the register number designated by a preceding instruction for writing an operation result data, such that a different one of said group of second registers having a different register number is used as said one register of said group of second registers having said same register number;
    controlling means connected to said allotting means, for selecting one of said operation means for execution of each of the instructions decoded by said decoding means, and for controlling transfer of the operand data and the operation result data between said one register of said group of second registers and said selected operation means; and
    writing means connected to said controlling means, for writing the operation result data from said selected operation means for the instruction decoded by said decoding means into a register of said group of first registers having a register number designated by said decoded instruction for writing the operation result data.

2. A data processor according to claim 1, further comprising:
    means connected to said writing means for indicating whether the operation result data of an instruction, which has been executed, has been written by said writing means into said register of said group of first registers having the register number designated by said instruction for writing the operation result data; and
    means connected to said decoding means and to said indicating means for inhibiting decoding of said succeeding instruction when the operation result data has not yet been written into said register of said group of first registers having the register number designated by said succeeding instruction for generating an address;
    said writing means further including means for inhibiting the writing of the operation result data of instructions other than the instruction which is decoded last among a plurality of instructions which are being executed in parallel and which designates the same register number for writing the operation result data, into said register of said group of first registers having the same register number.

* * * * *